United States Patent [19]
Einhaus et al.

[11] 4,008,885
[45] Feb. 22, 1977

[54] HOLDDOWN DEVICE FOR SHEARS

[75] Inventors: Albert Einhaus, Hagen; Rudi Gürnth, Herbede; Siegfried Klaus, Ennepetal, all of Germany

[73] Assignee: Firma Paul Ferd. Peddinghaus, Gevelsberg, Germany

[22] Filed: May 6, 1976

[21] Appl. No.: 683,744

[30] Foreign Application Priority Data
May 9, 1975 Germany .......................... 2520585

[52] U.S. Cl. .............................. 269/162; 269/229; 269/235
[51] Int. Cl.² .......................................... B25B 1/08
[58] Field of Search .......... 269/229, 232, 235, 236, 269/157, 162, 224

[56] References Cited
UNITED STATES PATENTS

| | | | |
|---|---|---|---|
| 1,575,648 | 3/1926 | Seybold | 269/229 |
| 2,052,976 | 9/1936 | Harcourt | 269/229 |
| 3,741,562 | 6/1973 | Resch | 269/235 |

Primary Examiner—Al Lawrence Smith
Assistant Examiner—Robert C. Watson
Attorney, Agent, or Firm—Dressler, Goldsmith, Clement, Gordon & Shore, Ltd.

[57] ABSTRACT

A holddown device for retaining material in place to be sheared, which holddown device includes a longitudinally movable beam that is resiliently maintained in its operating and starting positions, which resilient arrangement precludes breakage of the elements employed to position the beam during its various movements.

4 Claims, 2 Drawing Figures

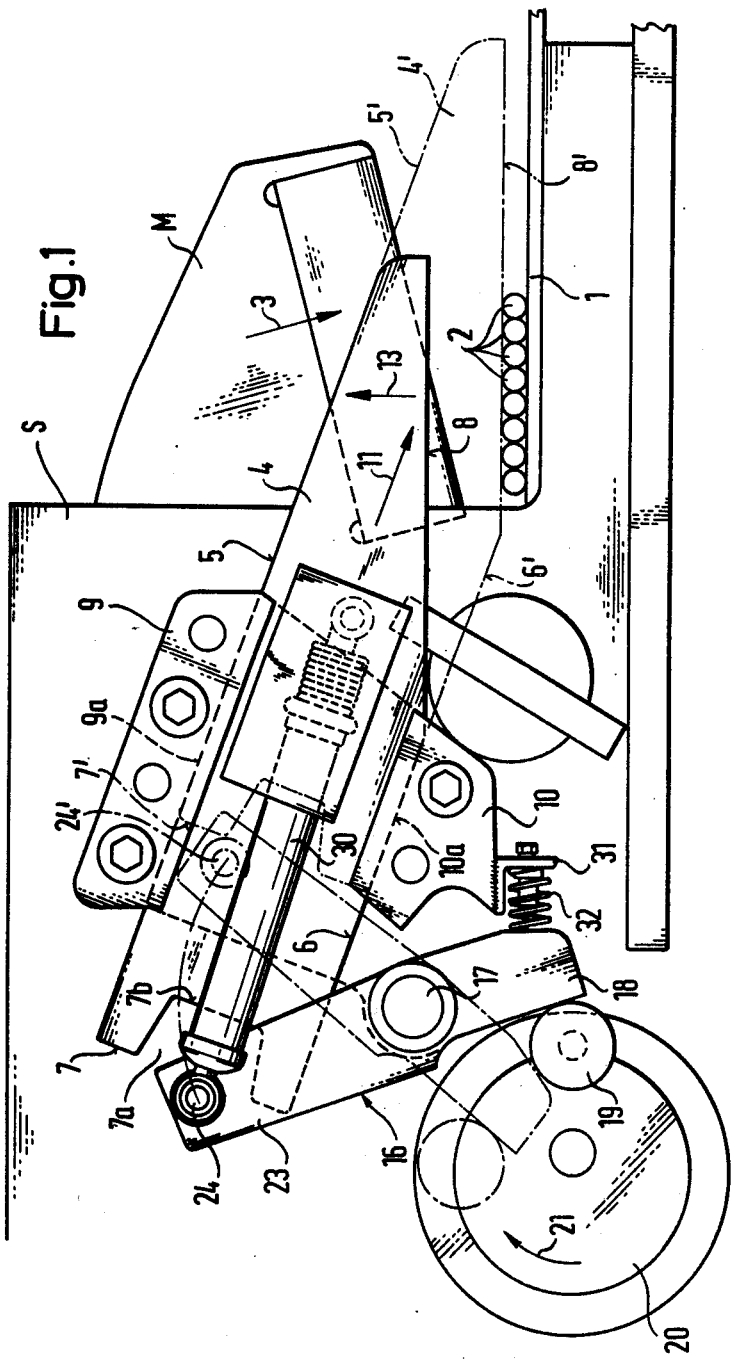
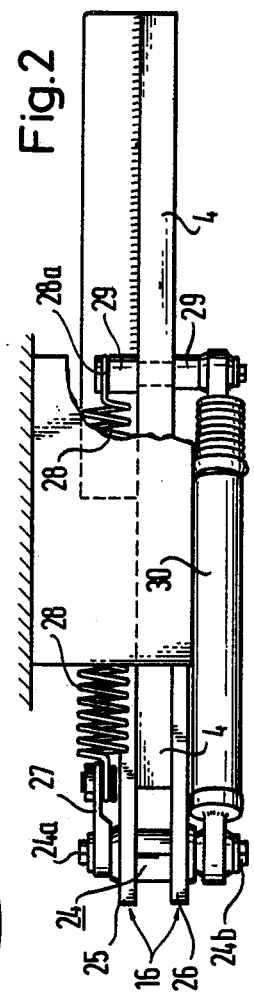

HOLDDOWN DEVICE FOR SHEARS

The invention relates to a holddown device for shears, particularly, for bar steel shears. The holddown device includes a trapezoidal beam that is guided on inclined tracks set laterally parallel to the shears opening. It is moved into operating position by its own weight and/or by spring action. The beam is shifted into its starting position through the action of a cam gear and a two-armed lever.

The holddown device has stood the test. However, in a small number of cases with prior art devices the holddown beam is clamped so tightly that driving members, or at least the linkage elements of the driving members with the holddown beam, even with solid dimensioning, break down during the return stroke to its starting position.

The task of the present invention is to eliminate the possibility of the return mechanism from breaking during the return motion by simple means. In other words, a holddown device in accordance with the present invention is provided, which makes possible a return of the holddown beam to its starting position with no danger of breakage of driving members or linkage parts.

As a solution for this task, the invention provides a holddown device whereby the free end of a two-armed lever is located adjacent to the holddown beam and is connected with the beam by a tension spring situated in the longitudinal direction of the beam. The holddown beam is returned to its starting position by rotating the two-armed lever back to its starting position. It is to be noted that the free end of the lever opposite the holddown beam is freely tiltable under spring force.

The invention originates from the conception of replacing the rigid connection, as practiced in the prior art with a pliable linkage between the two-armed lever and the holddown beam whereby to begin with, the two-armed lever is able to swing over to the direction of its starting position when the holding down beam is still in its operating position. When the pliable linkage in the form of the tension spring provides a sufficient amount of tension, this brings about the retraction of the holddown beam to its starting position. In this way, the alternating direction of engagement of the tension spring on the holddown beam due to the circular motion of the free end of the two-armed lever supports the stated effectiveness of the tension spring. A sudden striking of the holddown beam by the two-armed lever is, in any event, avoided. The danger of breakage of the linkage parts between the two-armed lever and the holddown beam is no longer to be feared. In order to prevent a sudden return skid of the holddown beam against the free end of the two-armed lever adjacent to the holddown beam upon release of the holddown beam, a shock absorber has been set up between the free end of the lever and the holddown beam parallel to the tension spring.

In further development of the invention, another pushing or pulling spring, when in its operating position, for the two-armed lever and the holddown beam, lies facing the free lever end adjacent to the drive cam.

As further advantageous refinement of the invention, space has been left between the free lever end adjacent to the holddown beam and the rear edge of the holddown beam. Added to this, this rear beam edge preferably has a rebound. Furthermore, most advantageously, the tension spring is a pre-tensed wound spring, i.e., a spring with initial tension around its longitudinal axis.

The drawing shows a form of construction of the holddown device according to the invention and, what is more, FIG. 1 shows a side view; and FIG. 2 shows a top plan view of the device.

Shears S have material surface 1 in the known manner upon which the bar steel is, to begin with, clustered and stored before cutting. Shear blade M moves along in the direction shown by arrow 3 and cuts the steel bars lying on bearing surface 1.

In order to bring the clustered bar steel into the spread out position 2 shown in FIG. 1 and, furthermore, in order to keep the bar steel in this position during cutting, holddown beam 4 with parallel sides 5, 6, end side 7, and the fourth side 8, has been provided. Thus, the holddown beam takes the form of a trapezoid with parallel sides 5, 6. On these, the holddown beam is guided at an angle of less than 45° to the horizontal on two plates 9, 10 with parallel tracks 9a, 10a. The holddown beam, herewith, slides in the direction of arrow 11 between both inclined tracks to its position 4' and is returned from here to its starting position shown in FIG. 1 in an unbroken line.

Sides 5 and 8 of the holddown beam occupy positions 5', 6', 7' and 8' in working position 4' of the holddown beam, i.e., side 8 retains its horizontal setting but undergoes lateral displacement. Because of this displacement in the direction of arrow 11, the steel bars, being at first clustered, are laterally dispersed, so that they occupy position 2 on bearing surface 1 as shown in FIG. 1.

During cutting, holddown beam 4 remains in position 4' since counterpressure in the direction of arrow 13 is operative, whereby momentum on the holddown beam results due to tracks 9a, 10a located laterally adjacent to the shears opening and the inclination of both tracks prevents a shift of the holddown device in its starting position.

End side 7 of beam 4 displays rebound 7a so that a bolt 24 at end 23 of lever 16 which, as may be seen in FIG. 2, is preferably made up of both parallel lever parts 25, 26 and held at a distance from edge 7b of rebound 7a. Two-armed lever 16 is tiltable at 17, whereby lever end 18 interacts with roller 19 of cam gear 20.

Bolt 24 is extended beyond and above the one lever part 25, whereby coupling link 27 engages tiltably with bolt extension 24a. Tension spring 28 is connected with this link 27, the former's second end being attached to extension 29 which is firmly affixed at approximately the middle of holddown beam 4. Tension spring end 28a, opposite to this pin 29, is also rotatable. Tension spring 28 is, preferably, tautly wound.

As may be seen in FIG. 1, the arrangement of tension spring 28 has been so dealt with that, in the main, it is situated in the longitudinal direction of holddown beam 4. The angularity of the tension spring opposite to beam 4 varies due to the circular movement of bolt 24 into position 24' and, conversely, so that the engagement angle of tension spring 28 on holddown beam 4 also varies.

Since bolt 24 lies exposed behind edge 7b of holddown beam 4, the bolt can withdraw from edge 7b upon cooking of tension spring 28 without lever 16 or parts of holddown device 4 suffering damage.

Furthermore, bolt 24 displays a second lengthening 24b which extends above and beyond lever part 26 and which tiltably engages one end of a shock absorber 30 whose second end is rotatably connected with bolt 29 which also protrudes over one side of holddown beam 4. Due to the shock absorber, it is seen to it that the holddown device 4 does not suddenly strike bolt 24 when the spring is tensed and holddown device 4 is loosened, but rather that a damped approach of the named parts into the position shown in FIG. 1 is carried out. For this purpose, the shock absorber, the construction of the tension spring and the movement of the lever 16 have been matched.

A compression spring 32 is set between the end 18 of lever 16, which interacts with roller 19 of cam gear 20, and fixed support 31, the spring seeing to it that lever 16 rotates clockwise when lever end 18 is released from the roller 19 of cam gear 20. Thus, holddown beam 4 is also moved by this, in addition to its own weight, when in its operating position 4'.

It is, of course, intended to cover by the appended claims all such modifications and variations that fall within the scope thereof.

What is claimed is:

1. A holddown device for shears mounted on a support structure including a trapezoidal beam guided on inclined tracks set laterally parallel to the shears opening, means for moving said beam between a starting position where it is out of engagement with the material it is to hold in place during shearing and an operating position where it is in engagement therewith, said means including a two-armed lever pivotally mounted relative to said support structure and disposed adjacent said beam, a tension spring situated in the longitudinal direction of said beam and connected at one end to said beam and at its other end to one arm of said lever, and cam and second spring means constructed and arranged to engage the other arm of said lever whereby the beam can be resiliently moved into and out of engagement with the material to be sheared.

2. A holddown device in accordance with claim 1 including a shock absorber connected between said one arm of said lever and said beam in an alignment generally parallel to said tension spring whereby the movement of the beam between the operating and starting position is dampened.

3. A holddown device in accordance with claim 2 in which the second spring means extends between said support structure and the other arm of said lever acting to maintain said lever arm in engagement with said cam to ensure that the cam will be effective to move the beam to its starting position.

4. A holddown device in accordance with claim 2 in which the tension spring and shock absorber are located on opposite sides of said beam.

* * * * *